United States Patent [19]

Buon

[11] Patent Number: 4,794,284

[45] Date of Patent: Dec. 27, 1988

[54] LINEAR D.C. MOTOR WITH NON-FERROUS STATOR CORE

[76] Inventor: Georges Buon, 166-41 Powells Cove Blvd., Flushing, N.Y. 11357

[21] Appl. No.: 31,243

[22] Filed: Mar. 26, 1987

[51] Int. Cl.⁴ ............................................. H02K 14/02
[52] U.S. Cl. ................................... 310/12; 310/156; 318/135
[58] Field of Search .................... 310/12, 14, 156, 13; 318/38, 135

[56] References Cited

U.S. PATENT DOCUMENTS

| | | | |
|---|---|---|---|
| 4,187,453 | 2/1980 | Rough | 310/12 X |
| 4,321,499 | 3/1982 | Gupta | 310/DIG. 6 |
| 4,369,383 | 1/1983 | Langley | 310/12 |
| 4,645,961 | 2/1987 | Malsky | 310/156 |
| 4,733,143 | 3/1988 | Chitayat | 318/135 |

Primary Examiner—Patrick R. Salce
Assistant Examiner—D. L. Rebsch
Attorney, Agent, or Firm—Roberts, Spiecens & Cohen

[57] ABSTRACT

The linear D.C. motor is provided with parallel tiers of windings arranged along a linear path. A commutator is connected to these windings and extends along and parallel to the path. A conductor is provided in the form of two parallel strips to supply current through the commutator and through the windings. A plurality of pairs of magnets is arranged with the magnets in each pair being in serial magnetic relationship on opposite sides of the parallel tiers. A support of high magnetic permeability material supports the magnets to form a substantially closed magnetic circuit having a gap in which the tiers of windings are accomodated. Brushes on the support couple the conductor and commutator, and the support is displaceable along the linear path for selectively passing current through the windings, to establish electromagnetic fields in sequence along the magnetic path. Displacement of the support moves the magnets along the linear path in correspondence with the fields. The windings are arranged in an epoxy resin matrix which incorporates fiberglass reinforcements. The windings and associated brushes are arranged so that the current passing through the windings is in the same direction for indentically polarized magnets.

16 Claims, 4 Drawing Sheets

LINEAR D.C. MOTOR WITH NON-FERROUS STATOR CORE

FIELD OF INVENTION

This invention relates to linear D.C. motors and more particularly to apparatus capable of converting D.C. current into a linear displacement of a movable object.

BACKGROUND

Various types of linear D.C. motors are known which are capable of developing large forces with reasonable rates of speed and acceleration which are useful, for example, in connection with the constitution of machine carriage drive systems. One of these types of linear motor is constituted by a moving component made of permanent magnets over a coil winding arrangement on soft-iron structure as the fixed component. In this type of motor, the moving magnets assembly beside providing the moving force to the machine carriage, also generates a force perpendicular to the plane of motion. This force is generated by the magnets in regard to the soft iron and it is in reality disturbing and in many cases deforms the structure or stresses it. To alleviate the problem, certain manufacturers put two motors back to back. In this manner, after a fashion, the structure is not stressed significantly. However, the motors become bulky and inertia forces are always present as another additional burden. Such motors may be of the classical commutator bars or brushless type if solid state devices are utilized to reverse electrical current sequentially in the coils. It is desirable, however, to avoid the above-indicated parasitic forces by eliminating the stator soft iron component, thereby suppressing all stresses while keeping only the useful vector force component along the length as described hereinbelow.

There are other types of linear motor/driver systems which areccalled micro steppers. In these motors, advancing forces are generated by external current pulses in windings associated with permanent magnets, to cause mover and stator to advance from one position of magnetic lock into another. These motors may operate up to 12,500 steps/inch even to 25,000 steps/inch. They do not require servo controls and operate in a digital fashion. The position of the mover is never absolutely accurate and can be disturbed by any external force superior to the magnetic lock. The useful vector force they achieve is quite low; 10 lbs. is a good maximum value.

SUMMARY OF INVENTION

It is an object of the invention to provide an improved linear motor or driver and especially one which is capable of operating with a D.C. source.

It is another object of the invention to provide an improved linear motor which does not exert any stress on the machine members to which it is coupled for purposes of operation, and thus allows the design of extremely precise motion mechanisms.

It is yet another object of the invention to provide an improved linear motor employing permanent magnets in such a way as to result in optimum magnetic flux density, thereby to employ and incorporate an ideal magnetic circuit substantially free of external magnetic leakage.

Yet another object of the invention is to provide an improved linear motor incorporating windings reacted upon without the utilization of a soft iron core and wherein the current/turns density is the maximum possible in the magnetic gap formed by magnets of opposite polarities.

Yet another object of the invention is to provide an improved linear motor incorporating a winding arrangement which is relatively very rigid and self-supporting and of relatively light mass.

Still another object of the invention is to provide an improved linear motor, the simplicity of the components of whih allows a very simple adaptation to machines of various kinds, particularly in high accuracy positioning systems.

Still another object of the invention is to provide an improved linear motor having a low signal-to-noise ratio and involving a relatively low impedance due in a large measure to the absence of the utilization of iron.

In achieving the above and other objects of the invention, there is provided a linear D.C. motor comprising parallel tiers of windings arranged along a linear path with a commutator extending along this path and being coupled to the windings and with a conductor being provided to supply current through the commutator and thus through the windings. In addition to the above, a plurality of pairs of magnets is arranged with the magnets in each pair being in serial magnetic relationship on opposite sides of the above-mentioned parallel tiers, there being further provided a support of high magnetic permeability material supporting the magnets to form a substantially closed magnetic circuit having a gap in which the tiers of windings are accommodated. In addition, there are provided brushes on the support for coupling the conductor and commutator arrangements, the support being displaceable along the above-mentioned linear path for selectively passing current through the windings to establish electromagnetic fields in sequence along the linear path and for displacing the magnets along the linear path in correspondence with the fields.

A particularly interesting feature of the invention is the provision of a matrix in which the above-mentioned tiers of windings are embedded whereby the windings are fixed relatively to each other in a substantially rigid structure which is of relatively light mass. In this arrangement, the windings may be of generally flat shape overlapping each other in the respective tiers, the matrix including, for example, an epoxy resin with a fibreglass reinforcement therein. More specifically, and as a particularly advantageous embodiment of the invention, the fibreglass reinforcement may be arranged in at least three layers located respectively between the aforementioned tiers and outwardly of the same. Also advantageously the layers may be constituted as woven sheets or layers. According to a further feature of the invention, the brush commutator and windings are interrelated and arranged so that all current flow is related to the magnetic circuit in a manner which balances out externally-directed stresses.

According to another feature of the invention, the plurality of pairs of magnets is so arranged that the magnets of adjacent pairs are oppositely polarized. The windings employed in association therewith preferably include rectilinear portions arranged perpendicularly to the linear path mentioned above, the magnets being all mounted on the aforesaid support and being displaceable by the support transversely across these rectilinear portions and centrally of the same. The pairs of magnets will preferably be arranged so that each pair brackets the parallel tiers.

In a preferred embodiment of the invention, the windings are arranged in groups of n windings each and each magnet will preferably extend across n windings.

In the preferred structure of the invention, the commutator includes a plurality of rectilinearly aligned conductive segments insulated from one another and the conductor includes parallel conductive strips. The brush arrangement includes various brushes contacting each of the strips and the segments of the commutator.

In accordance with a further feature of the invention, guide arrangements may be provided to guide the support along the linear path and in accordance with another feature of the invention, the aforesaid matrix will be a flat planar body. It will further be noted in the description which follows hereinbelow that the windings in one tier are offset from the windings in the other tier by half a pitch, considering a winding element as a full pitch.

Another feature is that if necessary the commutation may also extend to the brushless type of construction.

The above and other objects, features and advantages of the invention will be found in the Detailed Description which follows hereinbelow as illustrated in the accompanying drawing.

DETAILED DESCRIPTION

Figure 1:
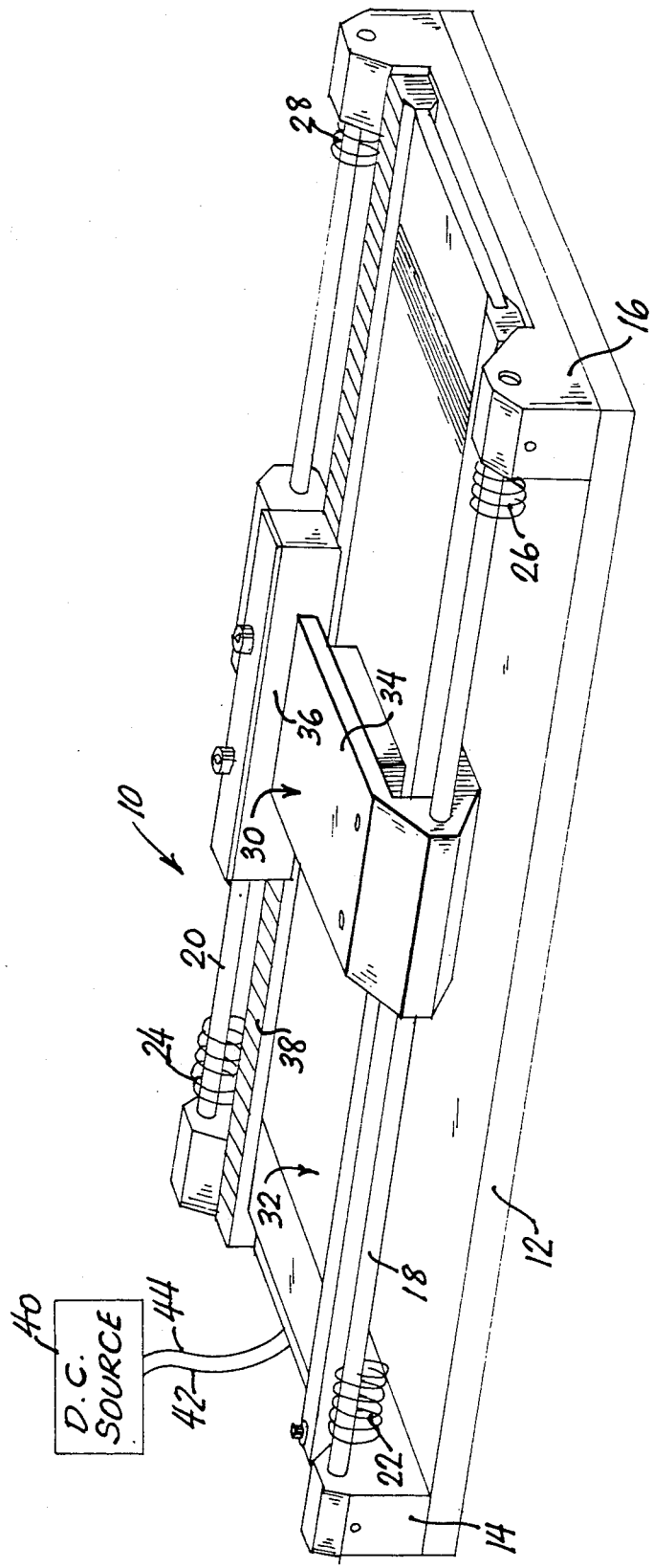
FIG. 1 is perspective view of one embodiment of the invention showing for purposes of illustration a framework for supporting the relatively displaceable parts of the linear motor of the invention.

In FIG. 1 is illustrated a linear D.C. motor 10 comprising a base 12 and end members 14 and 16, between which extend guide rods 18 and 20, at the respective ends of which are mounted cushioning springs 22 and 24 and 26 and 28. The guides base and end members, as well as the cushioning springs, are illustrated by way of example only inasmuch as, in any specific application, these members may be replaced by the members of a machine relative to which rectilinear motion is to be controlled.

Movable along the guides 18 and 20 is a support 30 having a bushing (not shown) through which extends the guide rod 18 and another bushing (not shown) through which extends the guide rod 20. The support 30 in essence encircles a winding arrangement 32 consisting of two tiers of windings mounted in spaced parallel relationship and embedded in a matrix to be described in greater detail hereinbelow. The support 30 includes a main section 34 which encircles the winding arrangement 32 and further includes a section 36 in which are installed brushes (to be described in greater detail hereinbelow), the purpose of which is to make contact with the commutator 38 and with parallel conductor halves (not shown in FIG. 1) to which power is supplied from D.C. source 40 via wires 42 and 44.

Figure 2:
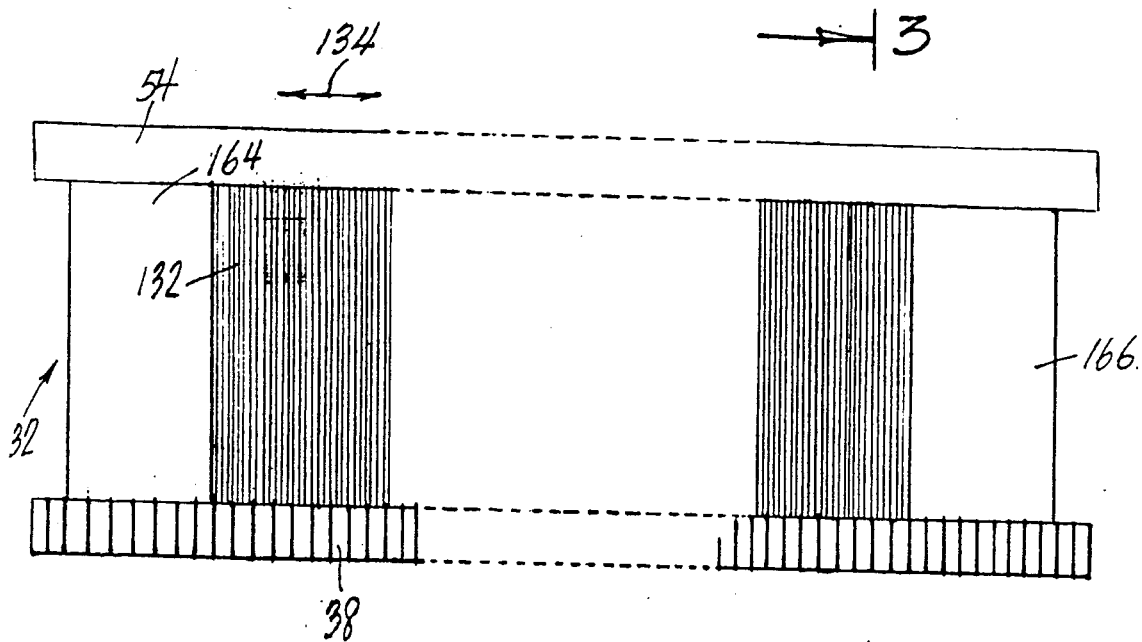
FIG. 2 is a top view of the winding arrangement employing a matrix support in accordance with a preferred embodiment of the invention.
Figure 3:
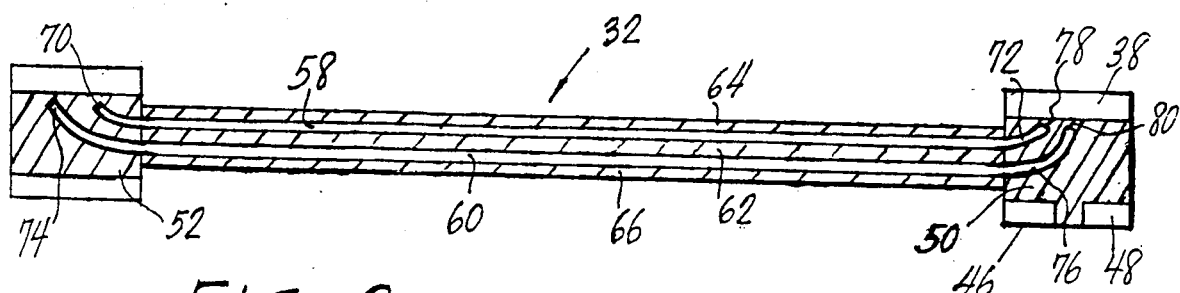
FIG. 3 is a cross-sectional view along line III—III of FIG. 2.

FIGS. 2 and 3 show the form of the winding arrangement 32 and more particularly it can be seen that this figure illustrates the commutator 38 in association with two parallel strips 46 and 48, all of which are held in a block of composite glass fibers and epoxy resin, the strips 46 and 48 being of copper or other such conductive material and having attached thereto the wires 42 and 44 of FIG. 1. Commutator 38, or the segments from which it is made, also is conventionally fabricated of copper or some other suitable conductive material. In similar conventional manner, the commutator segments are insulated from one another.

On the other side of the construction is a block 52 of composite material corresponding to that of block 50. Extending between the blocks 50 and 52 are two tiers 58 and 60 of windings. Between these two tiers is located a layer of reinforcing material which in a preferred embodiment of the invention is constituted by a woven layer of fibreglass reinforcement indicated at 62. Outside of the tiers of windings 58 and 60 are two further layers of fibreglass reinforcement also preferably of woven fabric form, these being indicated at 64 and 666. The sum total of this arrangement is embedded in a plastic matrix consisting preferably of an epoxy resin and having a cross-section in the shape of an I-beam. The whole constitutes a substantially rigid winding structure involving two tiers of windings, the arrangement of which will be discussed in greater detail hereinbelow. The structure illustrated in FIGS. 2 and 3 is of substantial strength and rigidity, while involving a relatively light weight or mass.

The ends of the windings 58 and 60 which are shown in FIG. 3 appear at 70 and 72 and at 74 and 76, respectively. These windings are embedded in the blocks 50 and 52 and are rigorously held therein. It will be noted that a connection of one end of the winding of tier 58 to commutator 38 is indicated at 78 and that another connection to an adjacent segment is indicated at 80 for the winding of tier 60.

Figure 5:
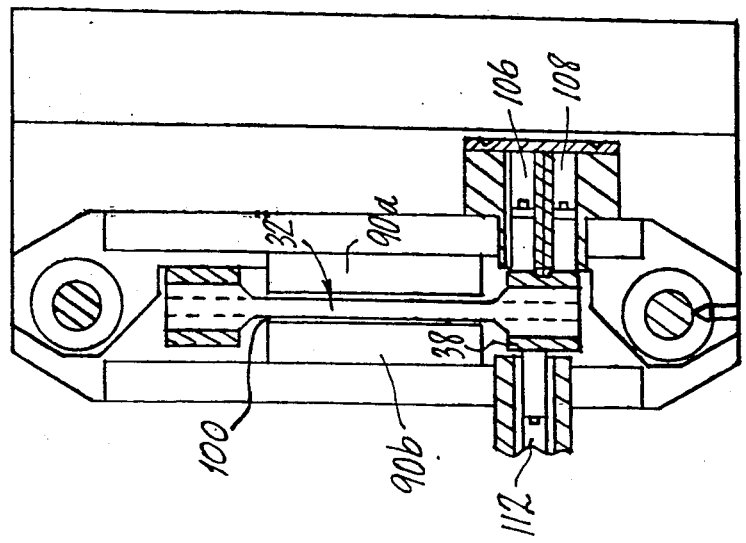
FIG. 5 is an end view partly in section of the structure of FIG. 4.
Figure 4:
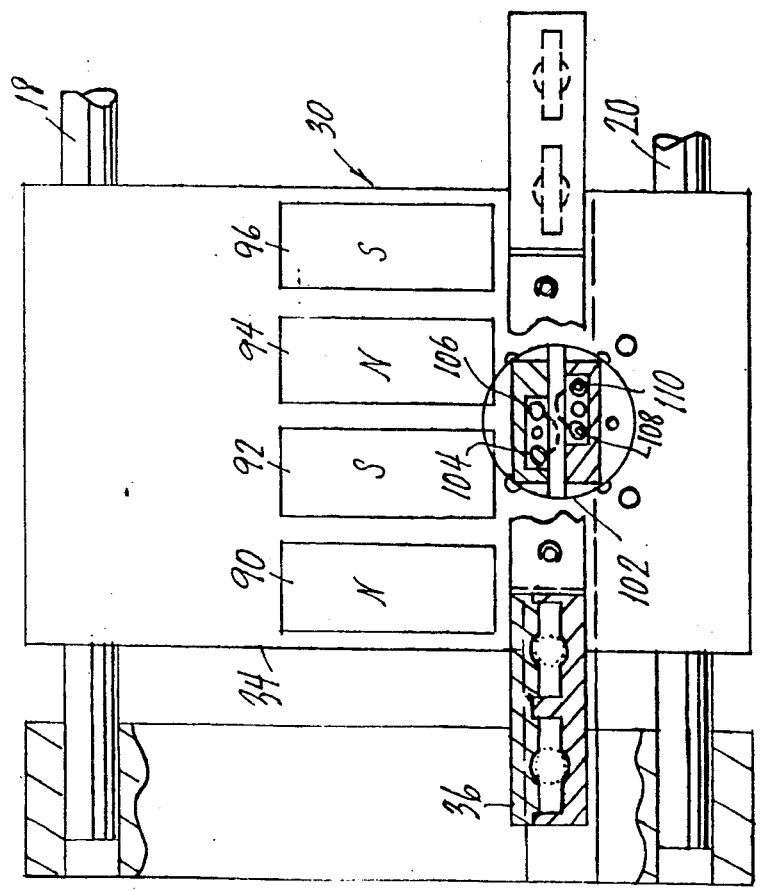
FIG. 4 is a fragmentary view of a portion of the structure of FIG. 1.

A further explanatory set of views of the structure of the invention appears in FIGS. 4 and 5 wherein is seen the support 30 mounted by way of example on guide rods 18 and 20. Herein appears the main section 34 of the support and the section 36 in which are embodied some of the brushes to which reference has been made hereinabove. Also appearing in FIG. 4 is a set of permanent magnets 90, 92, 94 and 96. These permanent magnets are preferably samarium cobalt nickel magnets, thus being of great strength. These magnets are alternately of opposite polarity. These magnets actually represent pairs of magnets as appears in FIG. 5 where, for example, is shown magnet 90A located at the udder side of support 30 and magnet 90B mounted at the top side of the support. Thus, each of the magnets appearing in FIG. 4 is representative of a pair of permanent magnets which bracket the structure of FIGS. 2 and 3. Accordingly, the gap 100 appearing in FIG. 5 accommodates the winding arrangement 32 as appears in FIGS. 2 and 3. Each of the pairs of magnets is similarly polarized or, in other words, the magnets of each pair is arranged in additive or magnetically serial relationship. However, the pairs of magnets are alternately arranged with opposite polarities. Thus, for example, the pair of magnets indicated at 92 is polarized oppositely to the pair of magnets indicated at 90 and the pair of magnets indicated at 94. Similarly, the pair of magnets indicated at 94 is polarized oppositely with respect to the pair of magnets indicated a 96.

Part of the structure is broken away as indicated at circle 102 wherein appear brushes 104 and 106 on the one hand, contacting the strip 46 appearing in FIG. 3 to make electrical engagement therewith. Pair of contacts 108 and 110 make electrical contact with the strip 48. This current or voltage is conveyed to the brushes indicated at 112 which are the brushes making contact with the various segments of the commutator 38 which has been mentioned hereinabove. Also appearing in FIG. 5 is the winding arrangement 32 configured as has been indicated in greater detail hereinabove.

Figure 6:
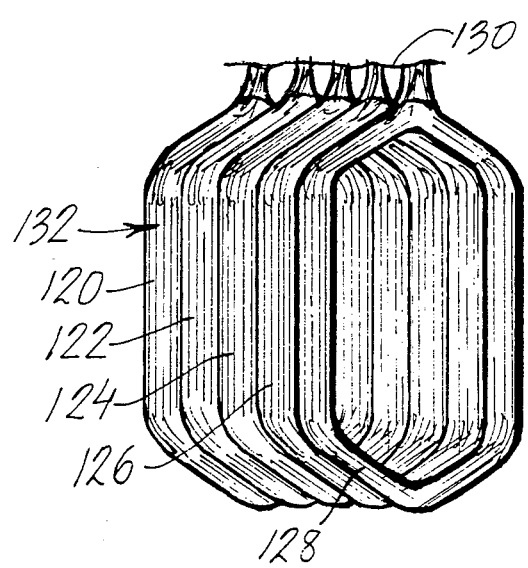
FIG. 6 illustrates a winding employed in accordance with the invention.

FIG. 6 indicates a single winding unit employed in accordance with the invention. It consists, for example, of winding sections 120, 122, 124, 126 and 128. The inputs and outputs of these windings are indicated by way of example at 130. Each of these windings includes two rectilinear sections indicated by way of example at 132. These rectilinear sections may now be viwwed with respect to FIG. 2 wherein it is seen that they traverse the longitudinal axis of the structure and are thus in a plane parallel to the linear path of the motor as may now be visualized in FIG. 2 as being defined by arrow 134.

Figure 7:
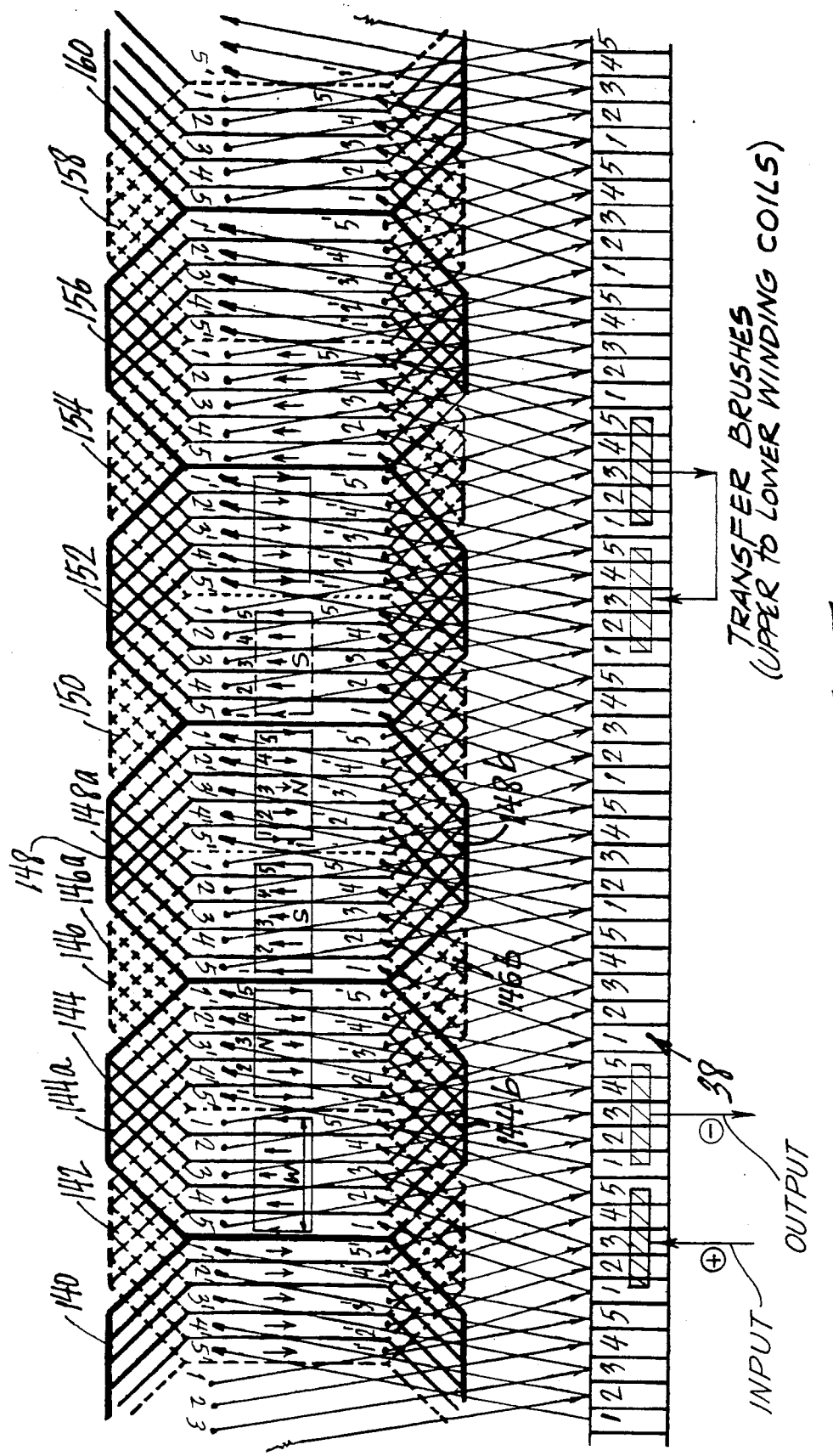
FIG. 7 illustrates an arrangement of windings in association with the commutator of the linear motor of the invention to achieve the goal of having appropriate current flow to generate the force vector along the length of the winding.

The commutator windings and brushes have a particular arrangement which is intended to minimize external stresses particularly when taken in consideration of the arrangement of magnets which has been described hereinabove. This arrangement may be more readily perceived with reference to the diagram illustrated in FIG. 7. Therein will be seen the commutator 38 and the windings 140, 142, 144, 146, 148, 150, 152, 154, 156, 158 and 160, each consisting of five winding sections as has been mentioned above and described relative to FIG. 6. Windings 140, 144, 148, 152, 156 and 160 are windings for example in the upper tier of windings indicated at 58 in FIG. 3. Windings 142, 146, 150, 154 and 158 are windings in the lower tier 60 as has been discussed above relative to FIG. 3. The windings in one of the tiers are staggered and in overlapping relationship with the windings in the other of the tiers. This can be readily perceived by seeing how the end portions, for eaample, 146A and 146B are interdigitated with respect to the end portions 144A and 144B of winding 144 and end portions 148A and 148B of windings 148. Also visible in the diagram of FIG. 7 are a plurality of magnets of the type and mounting which have been described above. In this illustration are illustrated six pairs of magnets, the lower magnets being hidden from view. Alternate of the pairs of magnets are oppositely polarized whereas the magnets in each pair of polarized in the same direction or, in other words, are in magnetically serial relationship. This has been referred to and described hereinabove. Each of the magnitudes is of a breadth W which is capable of spanning five of the aforementioned rectilinear sections such as indicated at 132 in FIG. 6. The direction of current may be readily traced in the diagram of FIG. 7. Thus, with reference to winding 144, current enterin at 3 will proceed through the winding and exit at winding 3'. Tracing through the various supplies it will then be noted that all current flowing through a winding section and traversing a magnet of given polarity will all be in the same direction for all magnets of the same polarity. The direction of current flow will be in the opposite direction for all magnets and magnet pairs of opposite polarity. This means that there will be no external stresses applied to externally-connected machine parts inasmuch as the forces involved will balance themselves out and will only be influential on the movement of the movable part of the structure; i.e. the support 30 (see FIG. 1) exemplary of the movable part of the machine to which the structure of the invention is to be applied for purposes of linearly driving the same.

It will also now appear that the winding structure shown in diagrammaticfform in FIG. 7 is held in substantally rigorous conformation by the utilization of a matrix (e.g. an epoxy resin matrix) in which the tiers of windings of the winding arrangement of the invention are embedded. It will be noted that these windings are of generally flat shape overlapping each other in the respective tiers and that the fibreglass reinforcement of the construction gives substantial strength and rigidity to the arrangement so that it is free from warpage and other reactions to ambient conditions such as temperature and the like. By reference to FIG. 2, it will be be noted that the fibreglass reinforcing fabric terminates the end portion of the winding arrangement. This fabric appearing at opposite ends and being indicated more particularly at 164 and 166. The support arrangement 30 being displaceable along the linear path of the motor of the invention provides for selectively passing current through the windings to establish electromagnetic magnetic fields in sequence along the linear path of the motor, the magnets being also displaced along the linear path in correspondence with the electromagnetic fields.

It will be noted in the above structures that there is an absence of soft iron material in the winding. Thus, there is not attractive force due to the magnetic crossflux of the magnets. This avoids parasitic effects such as distortion and stress.

There will now be obvious to those skilled in the art many modifications and variations of the structure set forth hereinabove. These modifications and variations will not depart from the scope of the invention if defined by the following claims:

What is claimed is:

1. A linear D.C. motor comprising flat parallel tiers of flat windings arranged along and parallel to a linear path, commutator mean extending along said path and coupled to said windings, conductor means to supply current through said commutator means and through said windings, at least one pair of magnets arranged in serial magnetic relation on opposite sides of said parallel tiers, support means of high magnetic permeability material supporting said magnets to form a substantially closed magnetic circuit having a gap in which said tiers of windings are accommodated, brush means on said support means for coupling said conductor means and commutator means, said support means being displaceable along said linear path for selectively passing current through said windings to establish electro-magnetic fields in sequence along said linear path, and for displacing said magnets along said linear path in correspondence with said fields, and a rigid matrix in which said tiers of windings are embedded whereby the windings are fixed relative to each other, the windings being of generally flat shape and overlapping each other in the respective tiers, said matrix including an epoxy resin and a fibreglass reinforcement in said resin.

2. A linear D.C. motor as claimed in claim 1 wherein said matrix is a flat planar body void of any soft iron.

3. A linear D.C. motor as claimed in claim 1 wherein said matrix has a cross-section with an I-beam shape.

4. A linear D.C. motor as claimed in claim 1 wherein the fibreglass reinforcement is arranged in at least three layers located respectively between said tiers and outwardly of the tiers.

5. A linear D.C. motor as claimed in claim 4 wherein the layers are each constituted as woven sheets.

6. A linear D.C. motor as claimed in claim 1 wherein said brush means, commutator means and windings are interrelated and arranged so that all current flow is related to said magnetic circuit in a manner which solely generates a useful linear vector force.

7. A linear D.C. motor as claimed in claim 1 comprising a plurality of pairs of said magnets including the first said pair, said pairs being in linear array parallel to said linear path, the magnets in each pair being in magnetically additive relation, the magnets of adjacent pairs being oppositely polarized.

8. A linear D.C. motor as claimed in claim 7 said windings including rectilinear portions arranged perpendicularly of said path, said magnets being all mounted on said support means and being displaceable by said support means transversely across said portions and centrally of the same.

9. A linear D.C. motor as claimed in claim 8 wherein the pairs of magnets each bracket the parallel tiers.

10. A linear D.C. motor as claimed in claim 8 wherein the windings are arranged in groups of n winding sections each and each magnet extends across n winding sections, the sections of each winding being arranged in shingle-like relation.

11. A linear D.C. motor as claimed in claim 10 wherein said commutator means includes a plurality of rectilinearly aligned conductive segments insulated from each other.

12. A linear D.C. motor as claimed in claim 11 wherein said conductor means includes parallel conductive strips.

13. A linear D.C. motor as claimed in claim 12 wherein said brush means includes brushes contacting each of said strips and brushes contacting said segments.

14. A linear D.C. motor as claimed in claim 13 comprising guide means in the form of fixed rods guiding said support means along said linear path.

15. A linear D.C. motor as claimed in claim 2, wherein the windings in one tier are offset from the windings in the other tier by half of a pitch.

16. A linear D.C. motor as claimed in claim 15 wherein the matrix being void of soft iron material does not exert any attractive force due to the magnetic cross flux of the magnets.

* * * * *

UNITED STATES PATENT AND TRADEMARK OFFICE
CERTIFICATE OF CORRECTION

PATENT NO. : 4,794,284
DATED : December 27, 1988
INVENTOR(S) : Georges Buon

Page 1 of 2

It is certified that error appears in the above-identified patent and that said Letters Patent is hereby corrected as shown below:

| Column | Line No. | is printed | Should read |
|---|---|---|---|
| 1 | 38 | arecalled | are called |
| 2 | 10 | whih | which |
| 4 | 13 | ahd | and |
| 4 | 30 | 666 | 66 |
| 4 | 60 | udder | under |
| 5 | 49 | eample | example |
| 5 | 66 | enterin | entering |
| 6 | 15 | diagrammaticfform | diagrammatic form |
| 6 | 33 & 34 | delete     "magnetic" | |

UNITED STATES PATENT AND TRADEMARK OFFICE
CERTIFICATE OF CORRECTION

PATENT NO. : 4,794,284
DATED : December 27, 1988
INVENTOR(S) : Georges Buon

It is certified that error appears in the above-identified patent and that said Letters Patent is hereby corrected as shown below:

| Column | Line No. | is printed | should read |
|--------|----------|------------|-------------|
| 5 | 26 | viwwed | viewed |

Signed and Sealed this

Fifteenth Day of August, 1989

Attest:

DONALD J. QUIGG

Attesting Officer     Commissioner of Patents and Trademarks